*(12)* United States Patent
Daicho et al.

(10) Patent No.: US 12,399,288 B2
(45) Date of Patent: Aug. 26, 2025

(54) MANUFACTURING METHOD OF SCINTILLATOR MATERIAL AND SCINTILLATOR MATERIAL

(71) Applicant: KOITO MANUFACTURING CO., LTD., Tokyo (JP)

(72) Inventors: Hisayoshi Daicho, Shizuoka (JP); Takeshi Iwasaki, Shizuoka (JP); Atsushi Nakamura, Shizuoka (JP)

(73) Assignee: KOITO MANUFACTURING CO., LTD., Tokyo (JP)

( * ) Notice: Subject to any disclaimer, the term of this patent is extended or adjusted under 35 U.S.C. 154(b) by 332 days.

(21) Appl. No.: 18/106,789

(22) Filed: Feb. 7, 2023

(65) Prior Publication Data

US 2023/0258830 A1  Aug. 17, 2023

(30) Foreign Application Priority Data

Feb. 16, 2022 (JP) .................. 2022-022513

(51) Int. Cl.
| | |
|---|---|
| *G01T 1/00* | (2006.01) |
| *C03C 3/06* | (2006.01) |
| *C03C 17/00* | (2006.01) |
| *C09K 11/61* | (2006.01) |
| *G01T 1/202* | (2006.01) |

(52) U.S. Cl.
CPC .............. *G01T 1/2023* (2013.01); *C03C 3/06* (2013.01); *C03C 17/006* (2013.01); *C09K 11/617* (2013.01); *C03C 2201/02* (2013.01); *C03C 2203/50* (2013.01); *C03C 2217/213* (2013.01); *C03C 2217/284* (2013.01); *C03C 2217/29* (2013.01); *C03C 2217/42* (2013.01); *C03C 2218/17* (2013.01)

(58) Field of Classification Search
CPC ..... G01T 1/202; G01T 1/2023; G01T 1/2018; G01T 1/2012; G01T 1/2006; G01T 1/20
See application file for complete search history.

(56) References Cited

U.S. PATENT DOCUMENTS

2019/0113635 A1* 4/2019 Daicho .................. G01T 1/16

FOREIGN PATENT DOCUMENTS

| | | |
|---|---|---|
| JP | 2019-074358 A | 5/2019 |
| WO | 2021/145260 A1 | 7/2021 |

\* cited by examiner

*Primary Examiner* — Dani Fox
(74) *Attorney, Agent, or Firm* — Venjuris, P.C.

(57) ABSTRACT

A method of manufacturing a scintillator material includes providing a substrate made of a quartz glass and having a recess formed therein; filling the recess with a raw material powder obtained by mixing an iodide raw material and $SiO_2$ fine particles; after filling the recess, disposing a lid on the substrate to cover the recess; and after disposing the lid, heating the substrate, thereby forming a nanocomposite layer in which an iodide phosphor is introduced into a cristobalite structure.

7 Claims, 6 Drawing Sheets

MANUFACTURING METHOD OF SCINTILLATOR MATERIAL AND SCINTILLATOR MATERIAL

CROSS-REFERENCE TO RELATED APPLICATIONS

This application is based on and claims priority from Japanese Patent Application No. 2022-022513, filed on Feb. 16, 2022, with the Japan Patent Office, the disclosure of which is incorporated herein in its entirety by reference.

TECHNICAL FIELD

The present disclosure relates to a method of manufacturing a scintillator material, and the scintillator material.

BACKGROUND

In a radiation detecting apparatus of related art, iodide such as NaI:Tl or CaI:Tl has been used as a scintillator material which is excited by radiation to emit visible light. Since the iodide-based scintillator material has a deliquescent property which causes the material to deliquesce when absorbing moisture in the air, the material needs to be used in a state of being sealed in a container with a high airtightness. Thus, in the radiation detecting apparatus of related art, the iodide-based scintillator material and a light detector are sealed in a container which is an aluminum can, and a glass window member is attached to a light extraction port, such that the light detector disposed in the container detects visible light.

However, since a small amount of water vapor in the outside air enters the container through the attachment portion between the container and the window member, the iodide-based scintillator deliquesces and thus deteriorates, and the management and maintenance need to be appropriately carried out for the radiation detecting apparatus in order to use the scintillator material for an extended period of time. Further, in order to suppress the entering of moisture into the container, the sealing with the high airtightness is required, and the number of steps in a manufacturing process increases, which deteriorates the workability.

In order to solve these problems, it has been proposed to use a nanocomposite scintillator material obtained by introducing $SrI_2:Eu^{2+}$ as a phosphor material into a cristobalite structure, thereby improving the moisture resistance (see, e.g., Japanese Patent Laid-Open Publication No. 2019-074358). However, in the technique of Japanese Patent Laid-Open Publication No. 2019-074358, since $SrI_2:Eu/SiO_2$ is composited with materials having different refractive indexes, a light scattering occurs at the hetero interface between $SrI_2:Eu$ and $SiO_2$, and a light emitter expands resulting in a blurring of an image, which causes a difficulty in improving the resolution of the detector using the scintillator material.

Thus, it has been proposed to form recesses in a quartz glass through an etching, fill the recess with the raw material of $SrI_2:Eu^{2+}$, and fire the material, so as to form a scintillator material in which a plurality of light emitting cells is arranged in a matrix form (see, e.g., WO 2021/145260).

SUMMARY

The technique of WO 2021/145260 has problems in that since the recesses are formed through an etching, the depth of each recess is merely about 500 nm, and it is not possible to secure the thickness of the nanocomposite layer in which the phosphor material is introduced into the cristobalite structure. Further, since the iodide raw material melts during the firing process, which causes volume expansion and overflow from the recesses, the thickness of the obtained composite layer is reduced. Further, since the composite layer is thin, it is difficult to improve the light emission intensity and the resolution by the radiation excitation.

The present disclosure has been made in view of the problems of related art above, and an object thereof is to provide a method of manufacturing a scintillator material which increases the thickness of a nanocomposite layer in which an iodide phosphor is introduced into a cristobalite structure, and enhances the light emission intensity so as to improve the resolution, and the scintillator material.

In order to solve the problems above, a method of manufacturing a scintillator material according to the present disclosure includes: providing a substrate made of a quartz glass and having a recess formed therein; filling the recess with a raw material powder obtained by mixing an iodide raw material and $SiO_2$ fine particles; after filling the recess, disposing a lid on the substrate to cover the recess; and after disposing the lid, heating the substrate, thereby forming a nanocomposite layer in which an iodide phosphor is introduced into a cristobalite structure.

In the method of manufacturing a scintillator material according to the present disclosure, the raw material powder obtained by mixing the iodide raw material and the $SiO_2$ fine particles is filled into the recess, and heating is performed in the state where the lid covers the recess. Thus, it is possible to suppress the volume expansion and the overflow of the iodide raw material caused from the melting, thereby increasing the thickness of the nanocomposite layer in which the iodide phosphor is introduced into the cristobalite structure, and enhancing the emission intensity to improve the resolution.

In an embodiment of the present disclosure, an average particle diameter (D50) of the $SiO_2$ fine particles falls in a range of 0.1 μm or more and 10 μm or less.

In an embodiment of the present disclosure, a content of the $SiO_2$ fine particles is 10 mol % or more and 600 mol % or less with respect to the iodide raw material.

In an embodiment of the present disclosure, in filling the recess, alkali halide is added into the recess.

In an embodiment of the present disclosure, a depth of the recess falls in a range of 0.5 mm or more and 3.0 mm or less.

In an embodiment of the present disclosure, a thickness of the nanocomposite layer is 0.1 mm or more.

In addition, a scintillator material of the present disclosure includes: a substrate made of a quartz glass and having a recess formed therein; and a nanocomposite layer in which an iodide phosphor is introduced into a cristobalite structure, in the recess. A thickness of the nanocomposite layer is 0.1 mm or more.

According to the present disclosure, it is possible to provide a method of manufacturing a scintillator material which increases the thickness of a nanocomposite layer in which an iodide phosphor is introduced into a cristobalite structure, and enhances the light emission intensity so as to improve the resolution, and the scintillator material.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE DRAWINGS

FIGS. 2A and 2B are schematic perspective views illustrating an example of a structure of the scintillator material according to the first embodiment, in which FIG. 2A illustrates an example where fine recesses are arranged in a matrix form, and FIG. 2B illustrates an example where one recess with a large area is formed.

FIGS. 5A and 5B are photographs representing the appearance of the scintillator material in Example 1, in which FIG. 5A represents the appearance when no light is emitted, and FIG. 5B represents the appearance during a photoluminescence (PL) light emission.

DETAILED DESCRIPTION

In the following detailed description, reference is made to the accompanying drawing, which form a part hereof. The illustrative embodiments described in the detailed description, drawing, and claims are not meant to be limiting. Other embodiments may be utilized, and other changes may be made, without departing from the spirit or scope of the subject matter presented here.

First Embodiment

Figure 1:
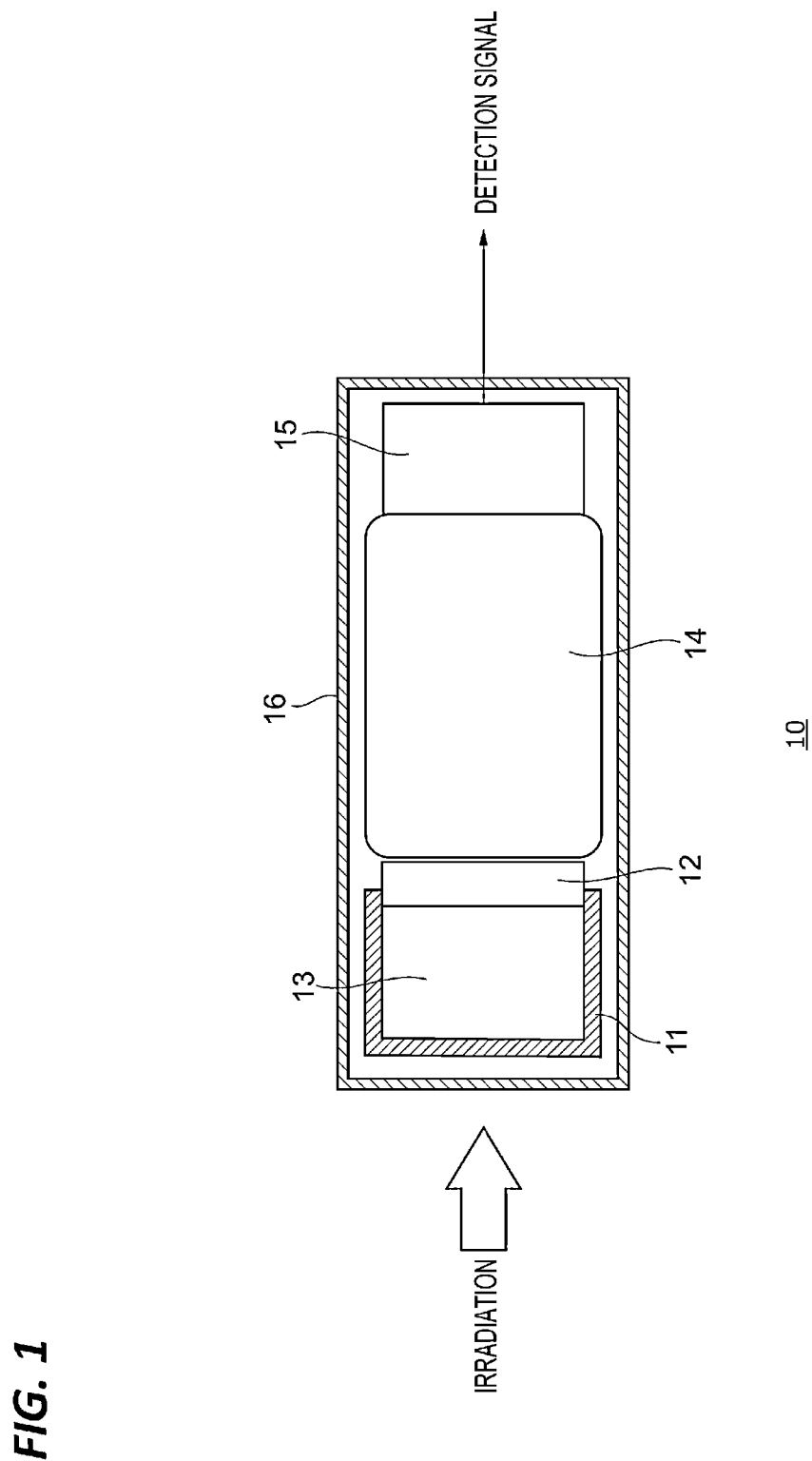
FIG. 1 is a schematic view illustrating a structure of a radiation detecting apparatus 10 using a scintillator material according to a first embodiment.

Hereinafter, embodiments of the present disclosure will be described in detail with reference to the drawings. The same or corresponding components, members, and processes illustrated in the respective drawings will be denoted by the same reference numerals, and overlapping descriptions thereof will be appropriately omitted. FIG. 1 is a schematic view illustrating a structure of a radiation detecting apparatus 10 using a scintillator material 13 according to the present embodiment. As illustrated in FIG. 1, the radiation detecting apparatus 10 includes a container 11, a window member 12, the scintillator material 13, a photomultiplier tube (PMT) 14, a bleeder circuit 15, and a light shielding case 16.

The container 11 is a substantially cylindrical member having an opening, accommodates the scintillator material 13 therein, and is connected to the photomultiplier tube 14 and the bleeder circuit 15 in the light shielding case 16. A window member 12 is airtightly fixed to the opening by, for example, an adhesive. While the material for the container 11 is not limited, for example, aluminum may be used. Further, the shape of the container 11 is not limited to the cylindrical shape, and may be appropriately designed according to the shape or size of each member accommodated in the container 11. A wiring hole (not illustrated) is formed in the container 11, and a wire is connected to the bleeder circuit 15 from the outside through the wiring hole.

The window member 12 is a plate-shaped member made of a material that transmits light emitted from the scintillator material 13, and is disposed at the opening of the container 11 to airtightly seal the inside of the container 11. The material for the window member 12 is not limited, and a known glass material may be used. An adhesive or the like is applied between the outer periphery of the window member 12 and the opening of the container 11, to implement an airtight sealing for preventing the entering of water vapor from the gap.

The scintillator material 13 is a member that is provided inside the container 11 and contains a fluorescent material which emits UV or visible light when being irradiated. The structure and the manufacturing method of the scintillator material 13 will be described later. In the present embodiment, a nanocomposite is used as the fluorescent material, which is obtained by introducing an iodide phosphor into a cristobalite structure where a portion of silica with a matrix phase is crystallized. The cristobalite structure preferably contains a trace amount of alkali halide.

The photomultiplier tube 14 is a member that detects a trace amount of photons and outputs an electrical signal. As for the structure of the photomultiplier tube 14, a known structure may be used, and for example, a structure in which a photocathode, a plurality of secondary electron multiplying electrodes (dynodes), an anode, and other electrodes are capsulated in a high-vacuum glass container may be used. The scintillator material 13 is disposed to face the light incident window of the photomultiplier tube 14, and the bleeder circuit 15 is connected to the output side of the bleeder circuit 15.

The bleeder circuit 15 is a member that supplies a voltage from a high voltage power supply to the photomultiplier tube 14 through a plurality of dividing resistors and outputs a current from the photomultiplier tube 14. The plurality of voltages from the high voltage power supply are supplied to the dynodes of the photomultiplier tube 14, respectively. The output of the bleeder circuit 15 is transmitted as a detection signal to an external signal processing unit via wires (not illustrated).

The light-shielding case 16 is a case-shaped member that is made of a light-shielding material and accommodates the container 11, the window member 12, the scintillator material 13, the photomultiplier tube 14, and the bleeder circuit 15 therein. Although not illustrated in FIG. 1, the light shielding case 16 is provided with a hole through which the wire of the bleeder circuit 15 is led out.

In the radiation detecting apparatus 10 illustrated in FIG. 1, when a radiation such as a gamma ray penetrates the light shielding case 16 and the container 11 and enters the scintillator material 13, the phosphor material in the scintillator material 13 is excited, and emits a blue light with the wavelength range of 380 nm or more and 500 nm or less. The photons of the blue light emitted from the scintillator material 13 pass through the window member 12, reach the photocathode of the photomultiplier tube 14, and are converted into electrons in the photocathode. When the electrons generated in the photocathode collide with the dynodes, a large number of electrons are ejected by the voltages applied to the dynodes, and the ejection of electrons occurs successively among the plurality of dynodes, so that the electrons generated from one photon are multiplied like avalanche. The current generated by the electrons multiplied in the photomultiplier tube 14 is transferred as a detection signal to an external signal processing unit via the bleeder circuit 15, and the signal processing unit calculates the number of photons from the relationship among the photons, the current, and the detection signal. Further, the signal processing unit calculates the intensity of radiation from the calculated number of photons.

Next, the phosphor material useful for the scintillator material 13 of the present embodiment will be described more in detail. Silica has an amorphous structure with a basic skeleton in which $SiO_4$ tetrahedrons are linked by Si—O—Si bonds. The bonding angle of Si—O—Si is $145°±10°$. When silica is heated, the thermal expansion coefficient is small up to around 1,000° C., but rises gently after around 1,000° C. This is because active hydrogen is generated from OH groups on the surface of silica, and the cleavage and the rearrangement of the Si—O—Si bonds occur in a portion of silica. At this time, the bonding angle of Si—O—Si becomes 180°, and large voids are generated in the $SiO_4$ linkage network. The voids serve as pockets for cations of metals such as $Sr^{2+}$, $Cs^+$, $Ca^{2+}$, $Eu^{2+}$, and $Tl^+$ and anions such as halogen, such that these ions are introduced into the $SiO_4$ linkage network.

In the introduced ions, the cations and the anions are bonded by a thermal diffusion, so that ion crystal nuclei are generated. It is understood that the generation of ion crystal nuclei triggers the crystallization of silica with the matrix phase so that the cristobalite is generated. In this way, it is presumed that the incorporation of the light-emitting metal halide salt and the crystallization of $SiO_2$ occur in parallel so that the nanocomposite scintillator material is produced.

Figure 2A:
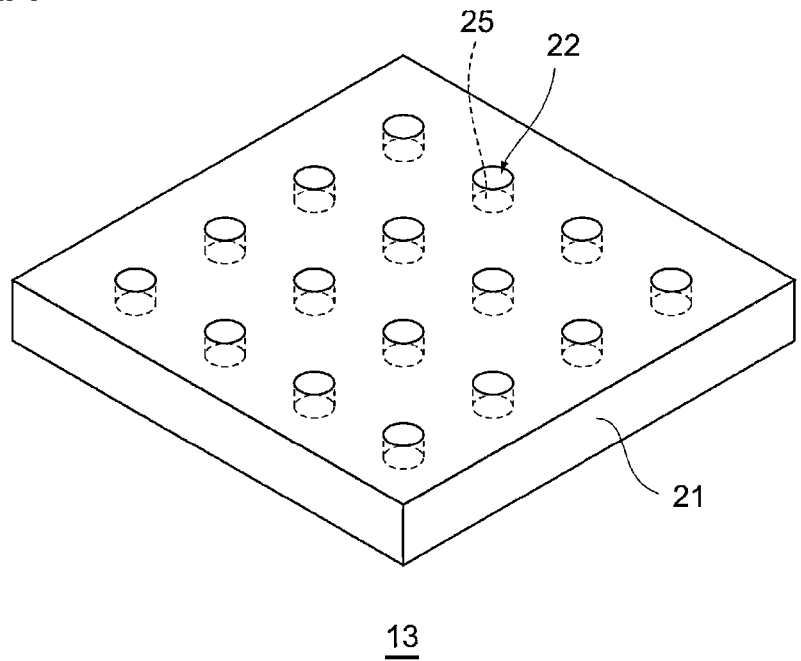
Figure 2B:
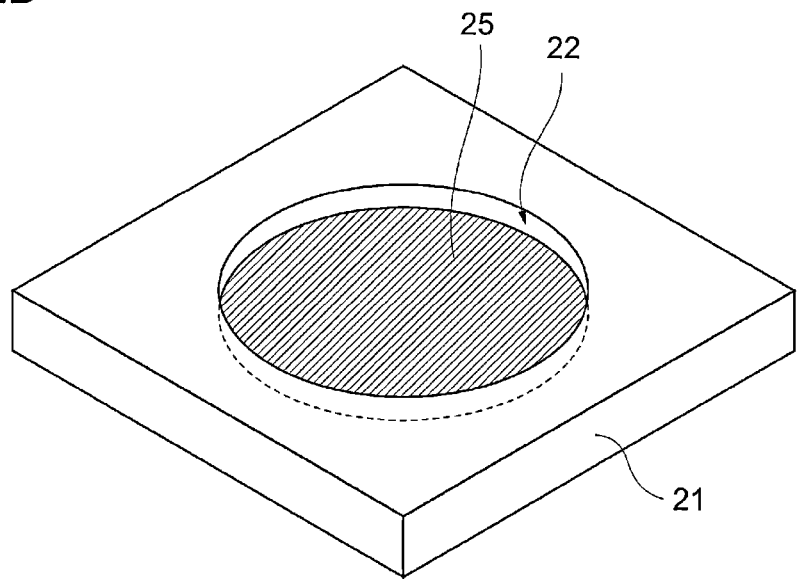

FIGS. 2A and 2B are schematic perspective views illustrating an example of the structure of the scintillator material 13 according to the present embodiment. FIG. 2A illustrates an example where fine recesses 22 are arranged in a matrix form, and FIG. 2B illustrates an example where one recess 22 with a large area is formed. As illustrated in FIGS. 2A and 2B, the scintillator material 13 according to the present embodiment has a structure in which the recesses 22 are formed in a substrate 21, and a nanocomposite layer 25 is formed in each recess 22.

The substrate 21 is a substantially plate-shaped member formed of a quartz glass, and a single or a plurality of recesses 22 is formed in one surface thereof. Each recess 22 has a hollow shape formed in one surface of the substrate 21 with a predetermined area and a predetermined depth. In the examples illustrated in FIGS. 2A and 2B, each recess 22 has a substantially cylindrical shape. However, the shape of the recess 22 is not limited, and for example, a conical shape, a polygonal columnar shape, or a polygonal pyramid shape may be used. The nanocomposite layer 25 is a layer in which the iodide phosphor is introduced into the cristobalite structure. The details of the material and the producing method of the nanocomposite layer 25 will be described later.

Figure 3A:
FIGS. 3A to 3E are process views schematically illustrating a method of manufacturing the scintillator material according to the first embodiment.

FIGS. 3A to 3E are process views schematically illustrating the method of manufacturing the scintillator material 13 according to the present embodiment. While FIG. 3A illustrates an example where the plurality of recesses 22 are formed in the substrate 21 illustrated in FIG. 2A, the scintillator material 13 may also be obtained by performing the same process when one recess 22 illustrated in FIG. 2B is formed.

Figure 3B:
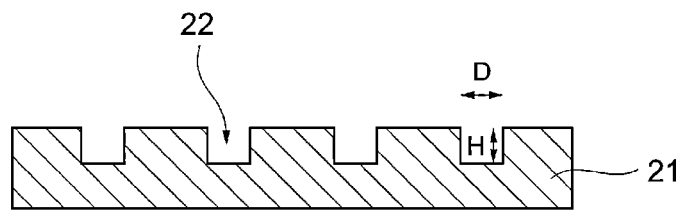

First, as illustrated in FIG. 3A, the plate-shaped substrate 21 made of quartz glass is prepared. Next, as illustrated in FIG. 3B, the recesses 22 each having a diameter D and a depth H are formed in the surface of the substrate 21. FIGS. 3A and 3B are steps for obtaining the substrate 21 having the recesses 22 formed therein, and correspond to a substrate preparing step in the present disclosure. The method of forming the recesses 22 is not limited, but the recesses 22 may be formed through a mechanical processing using, for example, a micromachining center, in order to form deeper recesses 22.

Here, the depth H of each recess 22 is preferably in the range of 0.5 mm or more and 3.0 mm or less, and more preferably in the range of 0.5 mm or more and 2.0 mm or less. When the depth H of the recess 22 is less than 0.5 mm, the amount of a raw material powder 23 that may be filled into the recesses 22 during a material filling step to be described later is insufficient, and thus, it may become difficult to obtain the sufficient nanocomposite layer 25. When the depth H of the recess 22 exceeds the range above, the filling amount of the raw material powder 23 becomes excessive, and thus, the nanocomposite layer 25 made of a matrix of cloudy and translucent cristobalite is formed to be thick with respect to the quartz. Thus, a light scattering/shielding occurs in the nanocomposite layer, and the resolution and the light emission amount may decrease. The diameter D of the recess 22 is not limited, and may be appropriately set according to the application of the scintillator material 13 and the conditions for the mechanical processing.

Next, in a raw material powder preparing step, a powder of an iodide raw material and a powder of $SiO_2$ fine particles are mixed to obtain the raw material powder 23. Here, examples of the iodide raw material include $SrI_2$, $CaI_2$, NaI, KI, CsI, and $EuI_2$. The average particle diameter (D50) of the $SiO_2$ fine particles is preferably in the range of 0.1 µm or more and 10 µm or less. When the average particle diameter of the $SiO_2$ fine particles is smaller than 0.1 µm, the particles are overly fine, and thus, the volume thereof increases, so that the filling into the recesses 22 may become difficult. When the average particle diameter of the $SiO_2$ fine particles is larger than 10 µm, the specific surface area of the particles is reduced, and thus, the reactivity decreases, so that the formation of the nanocomposite layer 25 may become insufficient. A method of forming the $SiO_2$ fine particles is not limited, and $SiO_2$ fine particles obtained according to known methods such as a melting method, a sol-gel method, and a precipitation method may be used. Further, as the $SiO_2$ fine particles, a powder of a phosphor material in which the iodide raw material is made in advance into a nanocomposite may be used.

The content of $SiO_2$ fine particles in the raw material powder 23 is preferably 10 mol % or more and 600 mol % or less with respect to the iodide raw material. When the content of the $SiO_2$ fine particles is less than 10 mol %, the iodide raw material may expand in volume during the firing of the nanocomposite layer 25 and overflow from the recesses 22 so that the formation range of the nanocomposite layer 25 may spread over the outside of the recesses 22, which may reduce the resolution during the radiation detection. When the content of the $SiO_2$ fine particles is more than 600 mol %, the progress in which the iodide raw material is made into a nanocomposite with the $SiO_2$ fine particles proceeds excessively, which may cause the insufficient integration of the substrate 21 with the quartz glass.

Figure 3C:
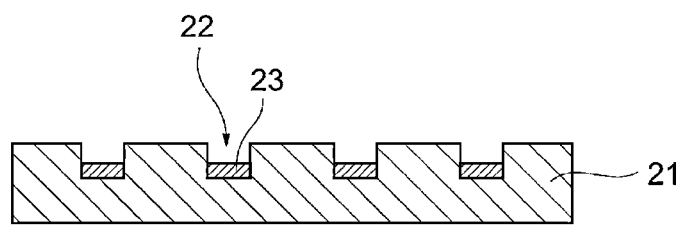

Next, in a material filling step illustrated in FIG. 3C, the raw material powder 23 prepared in the raw material powder preparing step is filled into the recesses. Here, the raw material powder 23 may be tapped after being filled in the powder form into the recesses 22, or the raw material powder 23 previously formed into a tablet shape may be disposed in each recess 22. The amount of the raw material powder 23 filled into the recesses 22 during the material filling step is not limited, but the filling amount is set to preferably 80% or less of the depth H of the recesses 22, and more preferably 60% or less, in order to prevent the overflow of the iodide raw material from the recesses 22 during the firing. Further, in the material filling step, a small amount of alkali halide may be added into the recesses 22, so as to promote the integration of the quartz glass of the substrate 21 and the $SiO_2$ fine particles.

Figure 3D:
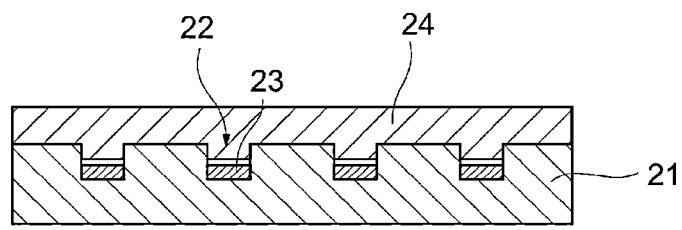

Next, in a lid disposing step illustrated in FIG. 3D, a lid 24 is disposed on the substrate 21 to cover the recesses 22. The material of the lid 24 is not limited as long as the material may bear a heating during a nanocomposite forming step to be described later and does not react with the raw material powder 23, and for example, a sapphire substrate may be used. While FIG. 3D illustrates an example where convex portions are formed on one surface of the lid 24 such that the convex portions fit into the recesses 22 of the substrate 21, the shape of the lid 24 is not limited as long as the lid 24 may cover the recesses 22.

Figure 3E:
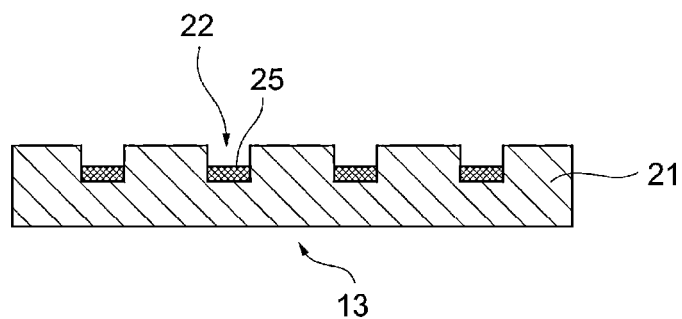

Next, in the nanocomposite forming step illustrated in FIG. 3E, the substrate 21 with the lid 24 disposed thereon is heated to react the iodide raw material with the silica glass of the substrate 21 and the $SiO_2$ fine particles, thereby forming the nanocomposite layer 25 in which the iodide phosphor is introduced into the cristobalite structure. Here, a nitrogen atmosphere containing hydrogen may be used as the atmosphere for performing the nanocomposite forming step. The temperature during the heating is preferably in the range of 850° C. to 1,000° C. In order to ensure the light emission intensity during the radiation detection, the thickness of the nanocomposite layer 25 may be increased to 0.1 mm or more.

In the nanocomposite forming step, the reaction between the iodide raw material and the $SiO_2$ fine particles and the reaction between the iodide raw material and the quartz glass of the substrate 21 are progressed in the recesses 22, so that the nanocomposite layer 25 integrated with the substrate 21 may be obtained. Further, since the iodide raw material and the $SiO_2$ fine particles are mixed in the raw material powder 23, it is possible to suppress the iodide raw material from expanding in volume during a heating (due to, e.g., a bumping phenomenon) and overflowing from the recesses 22. Further, since the heating is performed in the state where the lid 24 covers the recesses 22 during the nanocomposite forming step, the volatilization of iodine is suppressed, and the deficiency of iodine in the iodide phosphor is suppressed, so that the iodide phosphor with a satisfactory crystallinity may be obtained, and the thickness of the nanocomposite layer 25 may be increased.

By using the manufacturing method of the present embodiment as illustrated in FIGS. 3A to 3E, it is possible to obtain the scintillator material 13 provided with the substrate 21 which is made of a quartz glass and has the recesses 22 formed therein, and the nanocomposite layer 25 which is formed in the recesses 22 by introducing the iodide phosphor into the cristobalite structure and has the thickness of 0.1 mm or more.

Example 1

The scintillator material 13 according to Example 1 is obtained by introducing $SrI_2:Eu^{2+}$ as the phosphor material into the cristobalite structure, and contains Na as alkali metal ions. In the substrate preparing step, the substrate 21 made of a quartz glass having a thickness of 4 mm and a 15 mm square shape (a squire with 15 mm four sides) was prepared, and the recesses 22 each having the diameter D of 10 mm and the depth H of 2 mm were formed through a grinding. In the raw material powder preparing step, $SrI_2/EuI_2/NaI$ were each precisely weighed as the iodide raw material to reach a molar ratio of 1.0/0.1/0 under an Ar atmosphere which was an inert gas, in a glove box with a dew point temperature of −30° C. or lower, and disposed, pulverized, and mixed in a quartz mortar. Further, $SiO_2$ fine particles having an average particle diameter of 3 μm were prepared by a melting method, and the powder of the iodide raw material and the $SiO_2$ fine particles were mixed such that the molar ratio of the mixed material and the $SiO_2$ fine particles became 1.0/0.5, so as to obtain the raw material powder 23.

In the material filling step, 0.1 g of the obtained raw material powder 23 was formed into a tablet shape with the diameter of 9 mm, and disposed in the recesses 22. In the lid disposing step, a sapphire substrate having a 12 mm square shape was prepared as the lid 24, and disposed to cover the respective recesses 22. In the nanocomposite forming step, the firing was performed by heating the substrate 21 at 950° C. for 6 hours in a hydrogen-containing nitrogen atmosphere of $H_2/N_2$=5/95. Then, an ultrasonic cleaning was performed with warm pure water of 40° C. to remove excessive iodide, so that the scintillator material 13 of Example 1 in which the nanocomposite layer 25 was formed in the recesses 22 was obtained.

Example 2

The scintillator material 13 according to Example 2 is obtained by introducing $CaI_2:Eu^{2+}$ as the phosphor material into the cristobalite structure. In the substrate preparing step, the substrate 21 made of a quartz glass having a thickness of 4 mm and a 15 mm square shape was prepared, and the recesses 22 each having the diameter D of 10 mm and the depth H of 2 mm were formed through a grinding. In the raw material powder preparing step, $CaI_2/EuI_2$ were precisely weighed as the iodide raw material to reach a molar ratio of 1.0/0.1 under an Ar atmosphere which was an inert gas, in a glove box with a dew point temperature of −30° C. or lower, and disposed, pulverized, and mixed in a quartz mortar. Further, $SiO_2$ fine particles having an average particle diameter of 10 μm were prepared by a melting method, and the powder of the iodide raw material and the $SiO_2$ fine particles were mixed such that the molar ratio of the mixed material and the $SiO_2$ fine particles became 1.0/6.0, so as to obtain the raw material powder 23.

In the material filling step, 0.1 g of the obtained raw material powder 23 was put into the recesses 22 and tapped to fill the recesses 22. In the lid disposing step, a sapphire substrate having a 12 mm square shape was prepared as the lid 24, and disposed to cover the respective recesses 22. In the nanocomposite forming step, the firing was performed by heating the substrate 21 at 1,000° C. for 8 hours in a hydrogen-containing nitrogen atmosphere of $H_2/N_2$=5/95. Then, an ultrasonic cleaning was performed with warm pure water of 40° C. to remove excessive iodide, so that the scintillator material 13 of Example 2 in which the nanocomposite layer 25 was formed in the recesses 22 was obtained.

Example 3

The scintillator material 13 according to Example 3 is obtained by introducing $SrI_2:Eu^{2+}$ as the phosphor material into the cristobalite structure, and contains Na as alkali metal ions. In the substrate preparing step, the substrate 21 made of a quartz glass having a thickness of 2 mm and a 10 mm square shape was prepared, and the recesses 22 each having a diameter D of 5 mm and a depth H of 1.0 mm was formed through a grinding. In the raw material powder preparing step, $SrI_2/EuI_2/NaI$ were precisely weighed as the iodide raw material to reach a molar ratio of 1.0/0.08/0.01 under an Ar atmosphere which was an inert gas, in a glove box with a dew point temperature of −30° C. or lower, and disposed, pulverized, and mixed in a quartz mortar. Further, $SiO_2$ fine particles having an average particle diameter of 0.12 µm were prepared by a sol-gel method, and the powder of the iodide raw material and the $SiO_2$ fine particles were mixed such that the molar ratio of the mixed material and the $SiO_2$ fine particles became 1.0/0.2, so as to obtain the raw material powder 23.

In the material filling step, 0.02 g of the obtained raw material powder 23 was put into the recesses 22 and tapped to fill the recesses 22. In the lid disposing step, a sapphire substrate having a 10 mm square shape was prepared as the lid 24, and disposed to cover the respective recesses 22. In the nanocomposite forming step, the firing was performed by heating the substrate 21 at 900° C. for 6 hours in a hydrogen-containing nitrogen atmosphere of $H_2/N_2$=5/95. Then, an ultrasonic cleaning was performed with warm pure water of 40° C. to remove excessive iodide, so that the scintillator material 13 of Example 3 in which the nanocomposite layer 25 was formed in the recesses 22 was obtained.

Example 4

The scintillator material 13 according to Example 4 is obtained by introducing $SrI_2:Eu^{2+}$ as the phosphor material into the cristobalite structure, and contains K as alkali metal ions. In the substrate preparing step, the substrate 21 made of a quartz glass having a thickness of 2 mm and a 10 mm square shape was prepared, and the recesses 22 each having a diameter D of 5 mm and a depth H of 2 mm was formed through a dry etching. In the raw material powder preparing step, $SrI_2/EuI_2/KI$ were precisely weighed as the iodide raw material to reach a molar ratio of 1.0/0.15/0.01 under an Ar atmosphere which was an inert gas, in a glove box with a dew point temperature of −30° C. or lower, and disposed, pulverized, and mixed in a quartz mortar. Further, $SiO_2$ fine particles having an average particle diameter of 0.7 µm were prepared by a precipitation method. The powder of the iodide raw material and the $SiO_2$ fine particles were mixed such that the molar ratio of the mixed material and the $SiO_2$ fine particles became 1.0/3.0, so as to obtain the raw material powder 23.

In the material filling step, 0.01 g of the obtained raw material powder 23 was put into the recesses 22 and tapped to fill the recesses 22. In the lid disposing step, a sapphire substrate having a 10 mm square shape was prepared as the lid 24 and disposed to cover the respective recesses 22. In the nanocomposite forming step, the firing was performed by heating the substrate 21 at 880° C. for 5 hours in a hydrogen-containing nitrogen atmosphere of $H_2/N_2$=5/95. Then, an ultrasonic cleaning was performed with warm pure water of 40° C. to remove excessive iodide, so that the scintillator material 13 of Example 4 in which the nanocomposite layer 25 was formed in the recesses 22 was obtained.

Comparative Example

The scintillator material 13 according to a Comparative Example is obtained by introducing $SrI_2:Eu^{2+}$ as the phosphor material into the cristobalite structure, and contains Na as alkali metal ions. In the substrate preparing step, the substrate 21 made of a quartz glass having a thickness of 4 mm and a 15 mm square shape was prepared, and the recesses 22 each having a diameter D of 10 mm and a depth H of 2 mm was formed through a grinding. In the raw material powder preparing step, $SrI_2/EuI_2/NaI$ were precisely weighed as the iodide raw material to reach a molar ratio of 1.0/0.1/0.01 under an Ar atmosphere which was an inert gas, in a glove box with a dew point temperature of −30° C. or lower, and disposed, pulverized, and mixed in a quartz mortar.

In the material filling step, 0.1 g of the obtained raw material powder 23 was formed into a tablet shape with a diameter of 9 mm and disposed in the recesses 22. In the lid disposing step, a sapphire substrate having a 12 mm square shape was prepared as the lid 24 and disposed to cover the respective recesses 22. In the nanocomposite forming step, the firing was performed by heating the substrate 21 at 950° C. for 6 hours in a hydrogen-containing nitrogen atmosphere of $H_2/N_2$=5/95. In the Comparative Example, the iodide raw material in the raw material powder 23 overflowed from the recesses 22 and spread over the entire substrate 21. Then, an ultrasonic cleaning was performed with warm pure water of 40° C. to remove excessive iodide, so that the scintillator material 13 of the Comparative Example in which the nanocomposite layer 25 was formed in the recesses 22 was obtained.

(Film Thickness of Nanocomposite Layer 25)

The obtained scintillator materials 13 of Examples 1 to 4 and the Comparative Example were cut at the positions of the recesses 22, and the cross sections thereof were observed with an optical microscope. $SiO_2$ in the nanocomposite layer 25 becomes translucent because the amorphous structure changes to a polycrystalline cristobalite structure. The size of the translucent portion was measured to calculate the average film thickness of the nanocomposite layer 25.

Figure 4:
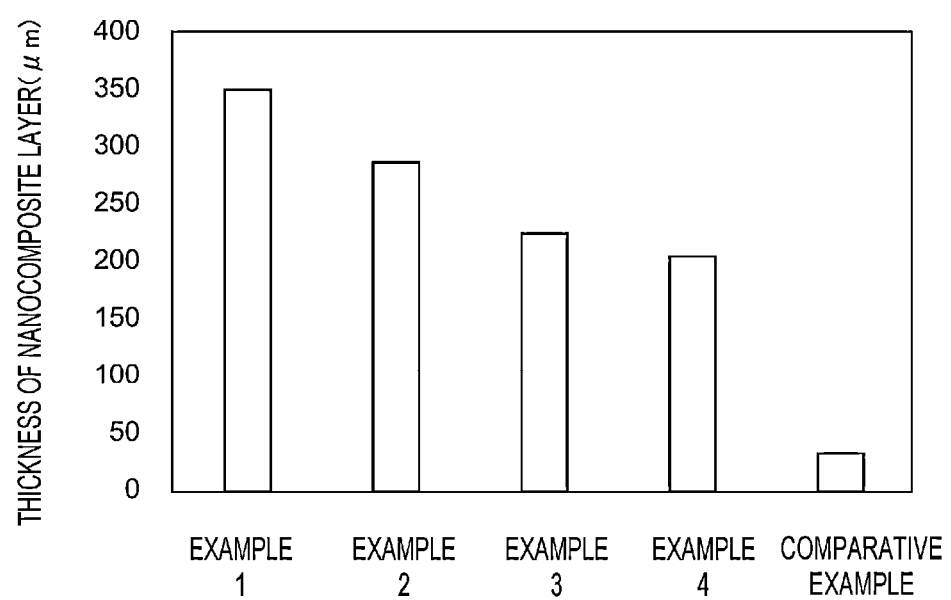
FIG. 4 is a graph representing the thickness of a nanocomposite layer in Examples 1 to 4 and a Comparative Example.

FIG. 4 is a graph illustrating the thicknesses of the nanocomposite layers 25 in Examples 1 to 4 and the Comparative Example. As illustrated in FIG. 4, it is confirmed that while the nanocomposite layer 25 with a thickness of 100 µm or more is formed in Examples 1 to 4, the thickness is less than 50 µm in the Comparative Example. It is understood this is because the raw material of the Comparative Example overflows from the recesses 22 and spreads over the entire substrate 21 in the nanocomposite forming step, and thus, the amount of reaction within the recesses 22 decreases.

(Light Emission Characteristics by UV Excitation)

Figure 5A:
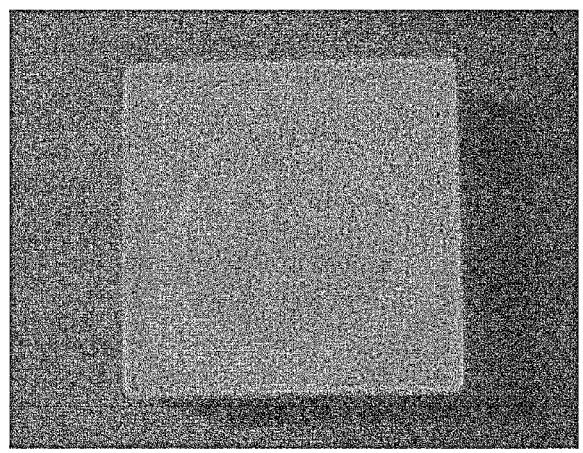
Figure 5B:
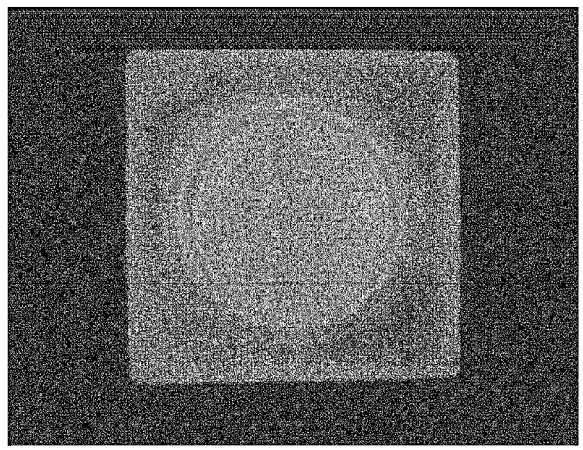

The obtained scintillator materials 13 of Examples 1 to 4 and the Comparative Example were irradiated with excitation light of 347 nm separated from a xenon lamp, to examine the area of a site where blue light was emitted by the PL (photoluminescence) light emission. FIGS. 5A and 5B are photographs representing the appearance of the scintillator material 13 of Example 1. FIG. 5A represents the appearance when no light is emitted, and FIG. 5B represents the appearance when PL light is emitted. The white portion in FIG. 5B is a light emitting region.

Table 1 provides results obtained from examining the area of the PL light emitting region for Examples 1 to 4 and the Comparative Example. In the scintillator materials 13 of Example 1 to 4, it is confirmed that the area of the PL light emitting region and the area of each recess 22 are substantially identical, and the blue light is emitted from only the bottom surfaces of the recesses 22. Meanwhile, in the scintillator material 13 of the Comparative Example, it is confirmed that the area of the PL light emitting region is larger than the area of each recess 22, and as a result of the overflow of the SrI$_2$:Eu raw material, the entire upper surface of the substrate 21 emits the PL light.

TABLE 1

|  | Size of Recess 22 | Examined Area of PL Light Emitting Region |
|---|---|---|
| Example 1 | Φ 10 mm, depth 2 mm | 78.5 mm$^2$ (φ 10 mm) |
| Example 2 | Φ 10 mm, depth 2 mm | 78.5 mm$^2$ (φ 10 mm) |
| Example 3 | Φ 5 mm, depth 1 mm | 19.6 mm$^2$ (φ 5 mm) |
| Example 4 | Φ 5 mm, depth 0.6 mm | 19.6 mm$^2$ (φ 5 mm) |
| Comparative Example | Φ 10 mm, depth 2 mm | 225 mm$^2$ (15 mm square shape) |

(Light Emission Characteristics by Radiation Excitation)

Figure 6:
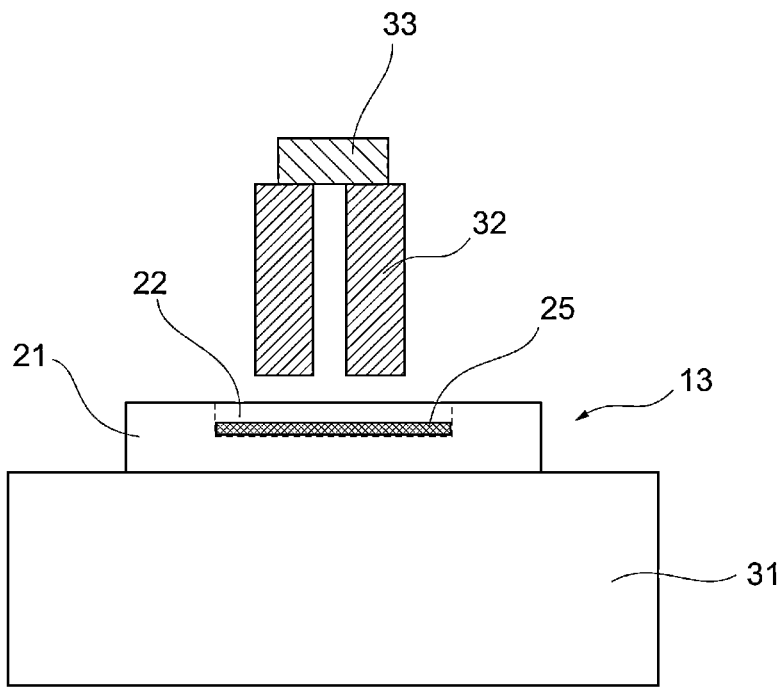
FIG. 6 is a schematic view illustrating an outline of an apparatus for measuring the light emission performance of the scintillator material through a γ-ray irradiation.

FIG. 6 is a schematic view illustrating an outline of an apparatus for measuring the light emitting performance of the scintillator material 13 by a γ-ray irradiation. In the measuring apparatus illustrated in FIG. 6, the scintillator material 13 is set on a photomultiplier tube 31, and irradiated with a gamma ray (γ ray) from a radiation source 33 through a lead collimator 32. In the scintillator material 13, the phosphor material in the nanocomposite layer 25 is excited by the gamma ray, so that light is emitted with a peak wavelength of 430 nm. The light emission in the scintillator material 13 is measured with the photomultiplier tube 31. As the radiation source 33, 662 keV of $^{137}$Cs is used.

Figure 7:
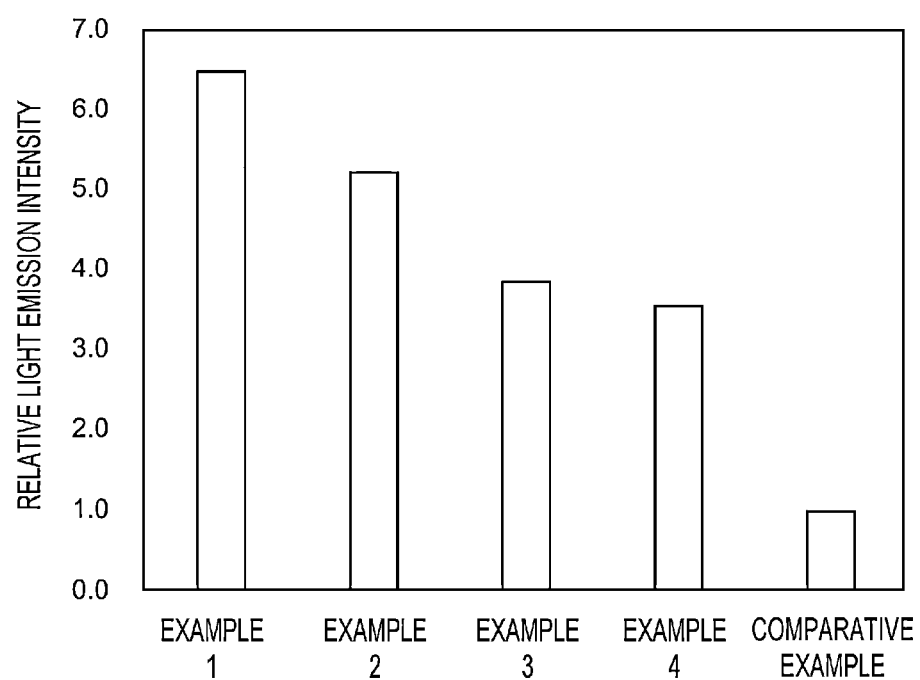
FIG. 7 is a graph representing the relative light emission intensity of the scintillator material through a gamma ray irradiation in Examples 1 to 4 and a Comparative Example.

FIG. 7 is a graph representing the relative light emission intensity of the scintillator material 13 by the gamma ray irradiation in each of Examples 1 to 4 and the Comparative Example. FIG. 7 represents the relative light emission intensity based on the light emission intensity of the Comparative Example. As illustrated in FIG. 7, the light emission intensity in Examples 1 to 4 is improved by 3.6 to 6.5 times that in the Comparative Example. It is believed this is because the nanocomposite layer is formed with a thickness of 100 μm or more only on the bottom surface of the recesses 22 in Examples 1 to 4, and the absorption rate of radiation in the nanocomposite layer 25 increases, which improves the light emission intensity. Meanwhile, in the Comparative Example, it is understood that since the raw material overflows and spreads over the outside of the recesses 22, the thickness of the nanocomposite layer 25 formed in the recesses 22 is insufficient, and thus, a sufficient light emission intensity is not obtained.

As described above, in the method of manufacturing the scintillator material 13 and the scintillator material 13 according to the present embodiment, the raw material powder 23 obtained by mixing the iodide raw material and the SiO$_2$ fine particles is filled into the recesses 22, and a heating is performed in the state where the lid 24 covers the recesses 22. Thus, it is possible to suppress the volume expansion and the overflow of the iodide raw material caused from the melting, thereby increasing the thickness of the nanocomposite layer 25 in which the iodide phosphor is introduced into the cristobalite structure, and enhancing the emission intensity to improve the resolution.

From the foregoing, it will be appreciated that various embodiments of the present disclosure have been described herein for purposes of illustration, and that various modifications may be made without departing from the scope and spirit of the present disclosure. Accordingly, the various embodiments disclosed herein are not intended to be limiting, with the true scope and spirit being indicated by the following claims.

What is claimed is:

1. A method of manufacturing a scintillator material, the method comprising:
   providing a substrate made of a quartz glass and having a recess formed therein;
   filling the recess with a raw material powder obtained by mixing an iodide raw material and SiO$_2$ fine particles;
   after filling the recess, disposing a lid on the substrate to cover the recess; and
   after disposing the lid, heating the substrate, thereby forming a nanocomposite layer in which an iodide phosphor is introduced into a cristobalite structure.

2. The method according to claim 1, wherein an average particle diameter (D50) of the SiO$_2$ fine particles falls in a range of 0.1 μm or more and 10 μm or less.

3. The method according to claim 1, wherein a content of the SiO$_2$ fine particles is 10 mol % or more and 600 mol % or less with respect to the iodide raw material.

4. The method according to claim 1, wherein in the filling the recess, alkali halide is added into the recess.

5. The method according to claim 1, wherein a depth of the recess falls in a range of 0.5 mm or more and 3.0 mm or less.

6. The method according to claim 1, wherein a thickness of the nanocomposite layer is 0.1 mm or more.

7. A scintillator material excited by an irradiation to emit visible light, the scintillator material comprising:
   a substrate made of a quartz glass and having a recess formed therein; and
   a nanocomposite layer in which an iodide phosphor is introduced into a cristobalite structure, in the recess,
   wherein a thickness of the nanocomposite layer is 0.1 mm or more.

* * * * *